(12) United States Patent
Yen et al.

(10) Patent No.: US 8,536,239 B1
(45) Date of Patent: *Sep. 17, 2013

(54) METHOD FOR PRODUCING IMPROVED RUBBERIZED CONCRETE USING WASTE RUBBER TIRES

(75) Inventors: Kuo-Ji Yen, Taipei (TW); Maw-Tien Lee, Chiayi (TW); Liang-Hsign Chou, Chiayi (TW); Jen-Ray Chang, Minhsiung Township (TW); Cho-Kun Yang, Chiayi (TW)

(73) Assignee: Chun Well Industry Co. Ltd., Taipei (TW)

( * ) Notice: Subject to any disclaimer, the term of this patent is extended or adjusted under 35 U.S.C. 154(b) by 273 days.

This patent is subject to a terminal disclaimer.

(21) Appl. No.: 13/099,323

(22) Filed: May 2, 2011

(51) Int. Cl.
C08J 11/04 (2006.01)

(52) U.S. Cl.
USPC .............. 521/41; 521/43; 521/45.5; 106/707; 106/709; 428/98; 428/150; 428/159; 428/411.1; 428/425.5

(58) Field of Classification Search
USPC ............. 521/40, 40.5, 41, 43, 45.5; 106/705, 106/706, 707, 708, 709; 428/98, 150, 159, 428/411, 1, 423.9, 425.5
See application file for complete search history.

(56) References Cited

U.S. PATENT DOCUMENTS

| | | | |
|---|---|---|---|
| 3,272,761 A | 9/1966 | Glenn | |
| 4,460,720 A | 7/1984 | Gaidis et al. | |
| 5,456,751 A | 10/1995 | Zandi et al. | |
| 5,624,491 A | 4/1997 | Liskowitz et al. | |
| 5,762,702 A | 6/1998 | Guy | |
| 5,849,818 A | 12/1998 | Walles | |
| 6,387,171 B1 | 5/2002 | Taylor et al. | |
| 6,942,726 B2 | 9/2005 | Cook et al. | |
| 7,820,094 B2 | 10/2010 | Ladely | |
| 2005/0096412 A1 | 5/2005 | Petr | |
| 2007/0249762 A1 | 10/2007 | Sylvester | |
| 2009/0203807 A1 | 8/2009 | Hough | |

FOREIGN PATENT DOCUMENTS

| | | |
|---|---|---|
| DE | 19731840 A1 | 1/1999 |
| GB | 2437280 A | 10/2007 |
| WO | 2006/056072 A1 | 6/2006 |

OTHER PUBLICATIONS

Chou et al , "Effects of partial oxidation of crumb rubber on properties of rubberized mortar", Composites: Part B Engineering, vol. 41, No. 8, 2010, pp. 613-616).*
Plank, J.; Hirsch, C., Impact of Zeta Potential of Early Cement Hydration Phases on Superplasticizer Adsorption, Cement and Concrete Research, 2007, 37 (4) 537-542.
Segre, N.; Joeke , I, Use of tire rubber particles as addition to cement paste, Cement and Concrete Research 2000, 30(9) 1421-1425.
Chou et al., Use of Waste rubber as concrete additive, Waste Manage & Res 2007, 25, 67-76.
Chou et al, Mortars with Partially oxidized Waste Rubber Crumbs, Advanced Materials Research vols. 156-157, 2011, pp. 1421-1424.

* cited by examiner

*Primary Examiner* — Frances Tischler
(74) *Attorney, Agent, or Firm* — Cascio & Zervas

(57) ABSTRACT

Partial oxidation of crumb rubber derived from environmental hazardous waste tires yields surface treated crumb rubber which are used as blending stocks for making rubberized concrete with substantially improved mechanical strength as compared to the conventional rubberized concrete. The chemically more active rubber surface becomes hydrophilic, so it interacts with the hydrophilic surface of surrounding cement matrix much stronger. The mechanically improved rubberized concrete is more versatile than conventional rubberized concrete.

21 Claims, 5 Drawing Sheets

METHOD FOR PRODUCING IMPROVED RUBBERIZED CONCRETE USING WASTE RUBBER TIRES

FIELD OF THE INVENTION

The present invention relates generally to rubberized concrete that is made from waste rubber tires. Crumb rubber is partially oxidized in a surface treatment technique whereby the hydrophobic rubber surface is transformed into a hydrophilic surface. Rubberized concrete made with the treated crumb rubber exhibit substantially improved mechanical characteristics as compared to conventional rubberized concrete.

BACKGROUND OF THE INVENTION

The disposal of waste rubber tires is major concern throughout the world. The U.S. alone adds approximately 270 million waste tires (3.6 million tons) annually to the several billions that already overflow landfills and causes environmental and health hazards. Many jurisdictions impose license fees or special taxes to defray the costs associated with tire disposal.

Recycling waste tire in the form of the crumb rubber in concrete has been developed as a cost effective solution to this problem. Rubberized concrete, which is less dense but more ductile than conventional concrete, is tough and impact resistance and is used, for instance, in noise barriers, heat insulation, and vibration dampening. Unfortunately, as crumb rubber replaces some of the aggregate in concrete, the compressive strength and splitting tensile strength of the resulting rubberized concrete are reduced proportionally. This severely limits the amount of crumb rubber that can be incorporated and curtails the range of rubberized concrete's applications. U.S. Pat. No. 5,456,751 to Zandi et al. discloses concrete compositions containing 0.05 to 20 percent by weight particulate rubber that are derived from recycled waste tires. The addition of rubber reduces the compressive strength of the concrete from 4,000 psi to 1,900 psi. This reduction occurs even in the presence of a "superplasticizer" that enhances the adhesion of tire rubber particles to the cement paste, which has been a major problem of rubberized concrete. U.S. Pat. No. 5,762,702 to Guy describes a rubberized concrete composition containing about 3.5 to 4.0 percent by weight shredded particulates comprising rubber, fibers and steel, that are obtained from whole waste tires, fly ash additives and a superplasticizer. Test cylinders made from the concrete composite exhibit a compressive strength of 4,000 psi at 7 days. The patent however provides no test data.

U.S. Patent Application 20050096412 to Petr et al. describes concrete compositions containing rubber aggregates, having distinct geometric shapes, along with superplasticizers, fly ash, carbon fiber, fiberglass, and steel that are mixed with the concrete compositions to vary properties of the finish products. The compressive strength of the rubberized concrete is lower than that of conventional concrete.

The primary reason for the lowered compressive and tensile strengths of rubberized concrete is that the crumb rubber particulates form relatively weak physical bonds with the concrete matrix. Superplasticizers appear to enhance the physical bonding between the hydrophobic rubber particulates and the hydrophilic concrete matrix that results in a moderately stronger rubberized concrete composite moderately.

Various surface techniques have been developed to promote stronger bonding between the rubber particles and the surrounding cement matrix. These techniques require, for instance, washing rubber particles with water, modifying the rubber surface with acid etching or plasma treatment, and employing coupling agents. Sodium hydroxide (NaOH) treatment appears to achieve the best results in enhancing the adhesion of tire rubber particles to the cement paste although the resulting rubberized concrete still show a 33 percent reduction in compression strength as compared to the conventional concrete. See, Segre, N. and Joekes, I., "Use of tire rubber particles as addition to cement paste", *Cement and Concrete Research* 2000, 30 (9), 1421-1425.

Chou et al. proposed a theoretical analysis to explain the effect of rubber additives on mechanical properties of the rubberized concrete and showed that the addition of rubber particles could block water diffucusion in rubberized concrete, leading to insufficient and imperfect hydration in some regions, even when the rubber particulates are chemically pretreated with sodium hydroxide. The reduced adhesion at the interfacial surface between cement and rubber grains is a critical factor for the reduction of the compressive strength in rubberized concrete. See, Chou, L. H.; Lu, C. K.; Chang, J. R.; Lee, M. T., "Use of waste rubber as concrete additive", *Waste Manage Res* 2007, 25 (1), 68-76.

The art is in need of improved techniques for modifying the surface properties of rubber particles in order to enhance the adhesion between the particles and surrounding cement matrix and to manufacture stronger rubberized concrete.

SUMMARY OF THE INVENTION

The present invention is based in part on the demonstration that subjecting crumb rubber to partial surface oxidation renders the surface hydrophilic. The so-modified rubber surface interacts strongly with the hydrophilic surface of surrounding cement matrix. The partially oxidized rubber particles can be mixed with cement mixes to produce rubberized concrete with substantially improved mechanical properties. The improved rubberized concrete is more versatile and can be employed in applications that are not suitable for conventional rubberized concrete.

In one aspect, the invention is directed to a concrete composition that includes cement and crumb rubber particles that are partially oxidized and have sulfur-containing, hydrophilic moieties comprising reactive functional groups. These moieties are preferably reactive to hydrophilic moieties present in cement matrix and comprise, for instance, sulfoxides (R—SO—R), sulfones (R—$SO_2$—R) and/or sulfur trioxides (R—$SO_3$).

In another aspect, the invention is directed to a method of preparing a concrete composition that includes the steps of:

(a) producing partially oxidized rubber particles by heating rubber particles in the presence of oxygen to partially oxidize the rubber particles such that the surface of the particles form functional groups that are selected from the group consisting of the sulfoxides (R—SO—R), sulfones (R—$SO_2$—R), sulfur trioxides (R—$SO_3$) and mixtures thereof, wherein R represents hydrocarbons of the rubber particles; and (b) combining the partially oxidized rubber particles with cement, aggregates and water to form a concrete mixture.

DETAILED DESCRIPTION OF THE PREFERRED EMBODIMENTS

Crumb rubber particles to be treated can be recovered from waste tires in a process that initially separates the rubber component from the steel wires, glass fibers, and other non-rubber materials; subsequently, debris-free rubber is recovered by cryogenic freezing with liquid nitrogen or other suitable means. The rubber is then mechanically grounded and screened into irregular-shaped particles of the desired size that typically ranges from 100-1,000 μm and preferably from 300-600 μm. The crumb rubber comprises natural rubber, styrene-butadiene rubber (SBR), butadiene rubber, butyl rubber, and/or isoprene rubber. These polymers are cross-linked by organic sulfur compounds that improve the durability and strength of cured rubber. The cured rubber also has additives including zinc oxide, carbon black, calcium carbonate, and antioxidants.

Organic sulfur compounds, which are represented generally as: R—S—R, can be oxidized into organic sulfoxides (R—SO—R), organic sulfones (R—SO$_2$—R), and organic trioxides (R—SO$_x$) under controlled conditions and into SO$_x$ gases under combustion at high temperatures. For the crumb rubber particles, 'R' represents the hydrocarbon rubber components connected to the sulfur-containing functional groups. The sulfoxide functional group (—S=O) is more active than the sulfone group (—SO$_2$), which in turn is more active than the sulfide group (—S—). For example, dimethyl sufoxide is chemically more active than dimethyl sulfone and much more active than dimethyl sulfide. With the present invention, partial oxidation chemically alters the surface of the crumb rubber particles by converting the sulfide functional group (—S—) into sulfone group (—SO$_2$), and preferably into sulfoxide group (—S=O).

Figure 1:
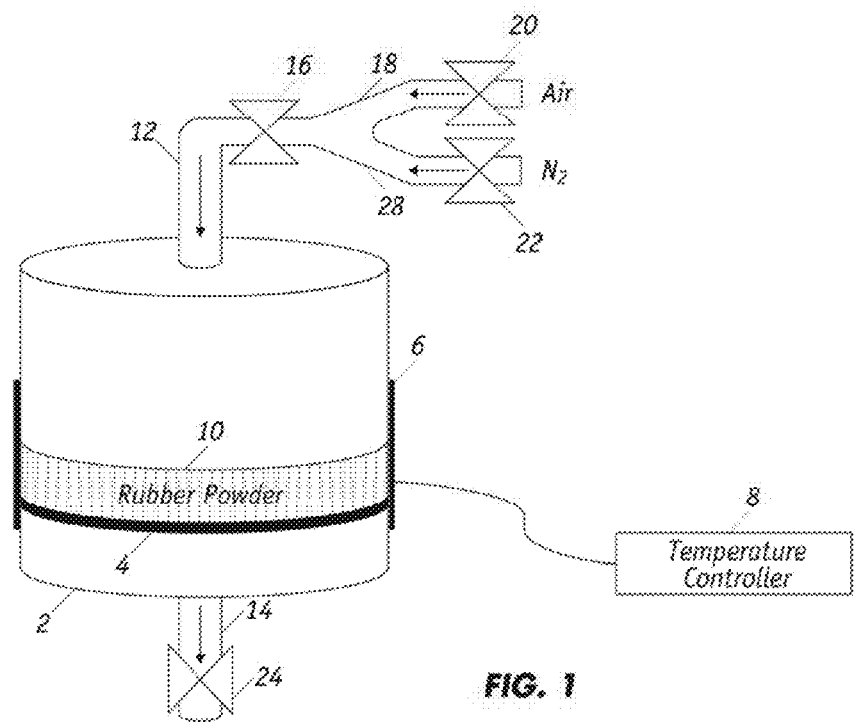
FIG. 1 is a schematic diagram of a batch partial oxidation reactor.

Rubber crumb derived from waste tires consisting of SBR and natural rubber produced by Chen-Hsing Rubber Co., TW were tested. Waste rubber tires were mechanically ground and screened to 300-600 μm. FIG. 1 illustrates a batch system that was configured to partially oxidize a predetermined amount of crumb rubber that is inserted into cylindrical batch reactor vessel 2 that is equipped with a meshed screen 4 to support a fixed rubber particle bed 10 within the reaction zone. The reaction zone approximately 8.2 cm in diameter and 19.5 cm in height. Gas inlet 12 and gas outlet 14 are located at the top and bottom of vessel 2, respectively. Gas inlet 12 is connected to a source of air 18 and oxygen 28. Valves 16, 20 and 22 regulate the flow of the air/oxygen mixture, oxygen and air, respectively. The air serves as a source of nitrogen, an inert gas, which moderates the rate of oxidation. In operation, a mixture of nitrogen and air is fed into the reactor zone and through the porous rubber particle bed at a controlled rate for a period of time sufficient for the desired air-to-nitrogen (A/N) volume ratio to be established; thereafter, valves 16 and 24 are closed. The A/N volume ratio typically ranges from 5/1 to 1/7 and preferably from 1/2 to 1/5.

The vessel is heated with an electrical heating ring 6 that is wrapped around the vessel's exterior; a thermal couple (not shown) measures the temperature in the reaction zone and signals therefrom are communicated to a temperature controller 8 that includes an electronic relay to regulate the temperature of the heating ring 6. The vessel is heated to a desired partial oxidation temperature that typically ranges from 100 to 500° C. and preferably from 200 to 300° C. The partial oxidation reaction is conducted for a predetermined period of time that typically ranges from 30 minutes to 3 hours and preferably from 45 minutes to 2 hours before the reactor is allowed to cool to room temperature.

Partial Oxidation of Reaction

For the partial oxidation experiments described herein, the air and nitrogen with the desired oxygen/nitrogen ratio passed through the reactor for 30 minutes to allow the system to equilibrate before the reactor zone sealed and the temperature raised to the desired level. Oxidation reaction was maintained for one hour in each case. Three temperature levels, namely: 150° C., 200° C., and 250° C. were evaluated. The crumb rubber treated by partial oxidation was analyzed with Fourier transform infrared (FTIR) spectrometry. Mortar mixtures containing cement, sand, and water incorporating crumb rubber level (6% by weight) were tested. Portland cement by Taiwan Cement Co. was used. Mortar specimens were prepared by adding standard Ottawa sand from US Silica Company. They were prepared with cubic molders to facilitate the physical testing of specimens. All specimens were prepared with the water/cement ratio of 0.62 to assure sufficient water in mortars. Measurements of compressive, flexural, and tensile strengths of specimens were conducted according to ASTM standards methods, C109, C190 and C348. The fracture surfaces of mortar fragments obtained from the compressive test were observed with SEM.

Figure 2:
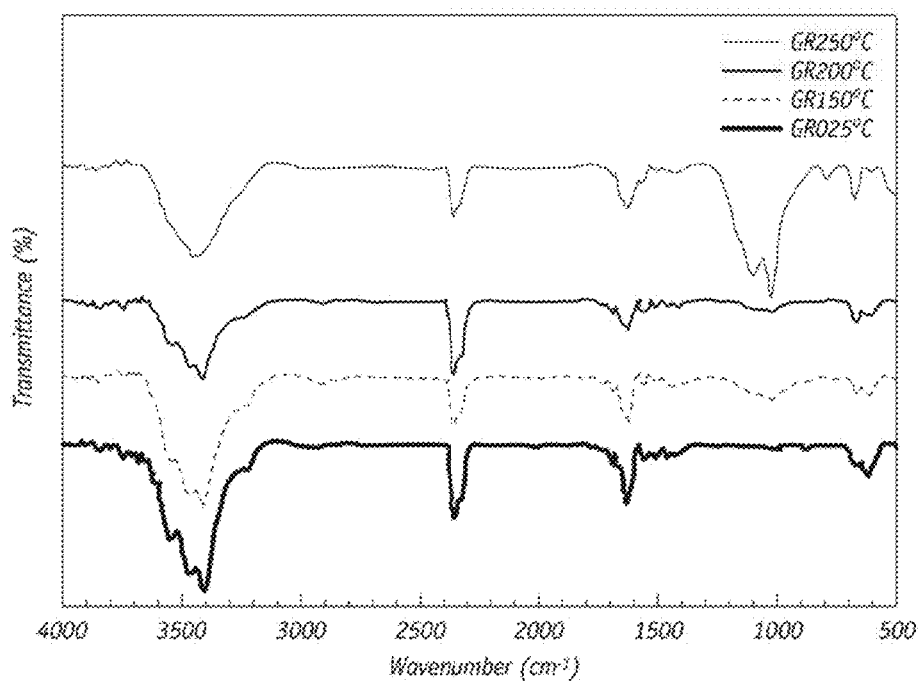
FIG. 2 shows the IR spectra of crumb rubber treated at three temperatures.

FIG. 2 shows IR spectra of the crumb rubber that was treated in three temperatures (150° C., 200° C., and 250° C.) at the same oxygen level. Spectra show that there are two prominent absorptions in the region of 1100-1000 cm$^{-1}$ that correspond to the stretching absorption of the two S=O bonds of R—SO$_2$—R. In the region of 980-960 cm$^{-1}$, a shoulder-like bulge of the absorption is observed. It is the S—O bond stretching absorption of R—SO—R. This result shows that after treatment of the crumb rubber, parts of RSR on the surface of the crumb rubber were oxidized to R—SO$_2$—R and R—SO—R. FIG. 2 also suggests that the crumb rubber treated at 250° C. had the strongest S=O and S—O adsorptions. 250° C. or higher temperatures caused thermal cracking.

Figure 3:
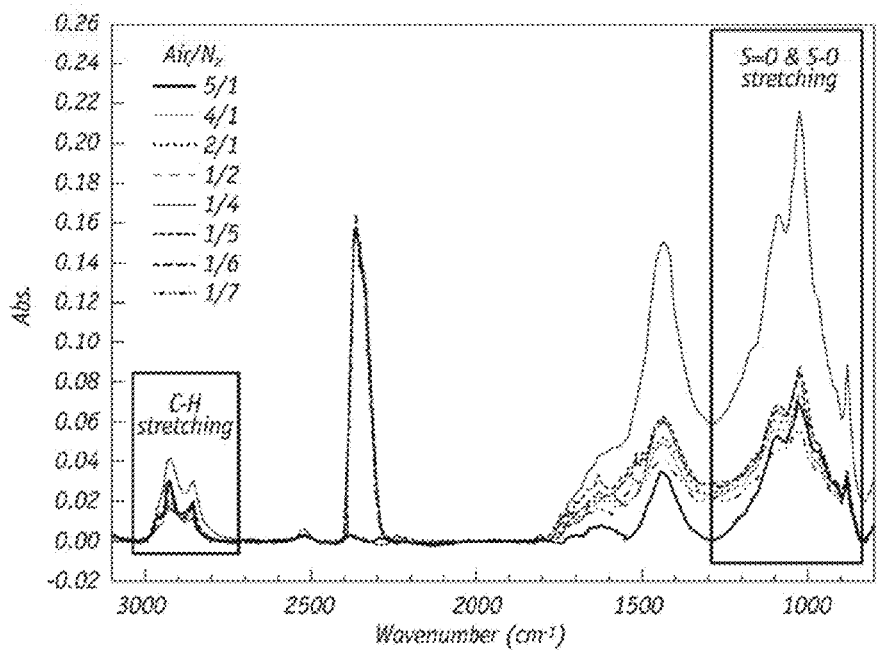
FIG. 3 shows the IR spectra of crumb rubber treated at various oxygen/nitrogen ratios.
Figure 4:
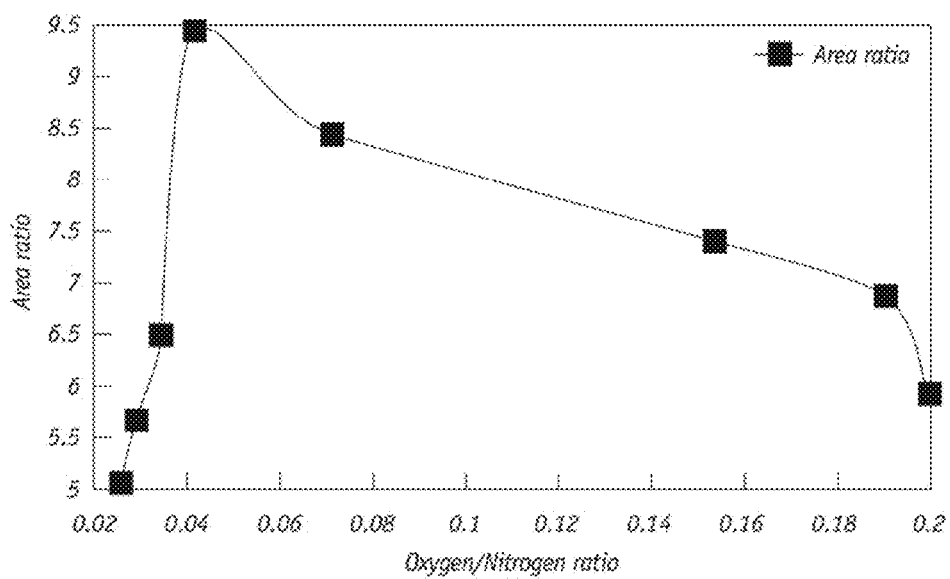
FIG. 4 shows the effects of oxygen content on the production of S=O on crumb rubber, where the area ratio is equal to (the S=O stretching area)/(sp$^3$ C—H area)

Various oxygen/nitrogen ratios were tested to investigate the effects of oxygen content on partial oxidation. FIG. 3 shows IR spectra of the crumb rubber treated at various oxygen/nitrogen ratios. The area of the stretching absorption of hydrocarbon of sp$^3$ bond (area of H) and the area of the stretching of absorption of SO$_2$ and SO (area of S) were integrated. The area ratios (area of S/area of H) of these two area values were calculated for various oxygen/nitrogen ratios and depicted in FIG. 4. It is apparent that the area ratio gives a sharp rise when oxygen/nitrogen ratio less than 0.04, and goes through a maximum at the oxygen/nitrogen ratio=0.04. This may be due to the oxidation of sulfur atoms on the surface of crumb rubber. However with the increase of the oxygen content, the over oxidation of sulfur atoms induced the thermal cracking of the crumb rubber and thereby reduced the area ratio. Therefore, in a preferred partial oxidation process, the reaction should be conducted in an environment with temperature less than 250° C., and the oxygen/nitrogen ratio=0.04 or less.

Effects of Adding Waste Tire on Mechanical Strengths of Mortar Specimens

Figure 5:
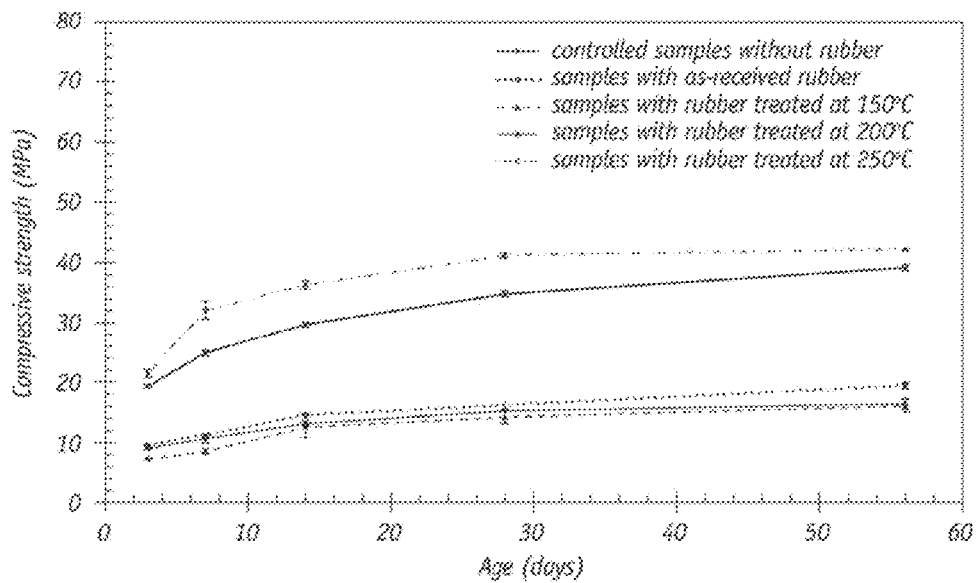
FIGS. 5, 6 and 7 show the compressive, flexural and tensile strengths, respectively, of mortar specimens.
Figure 6:
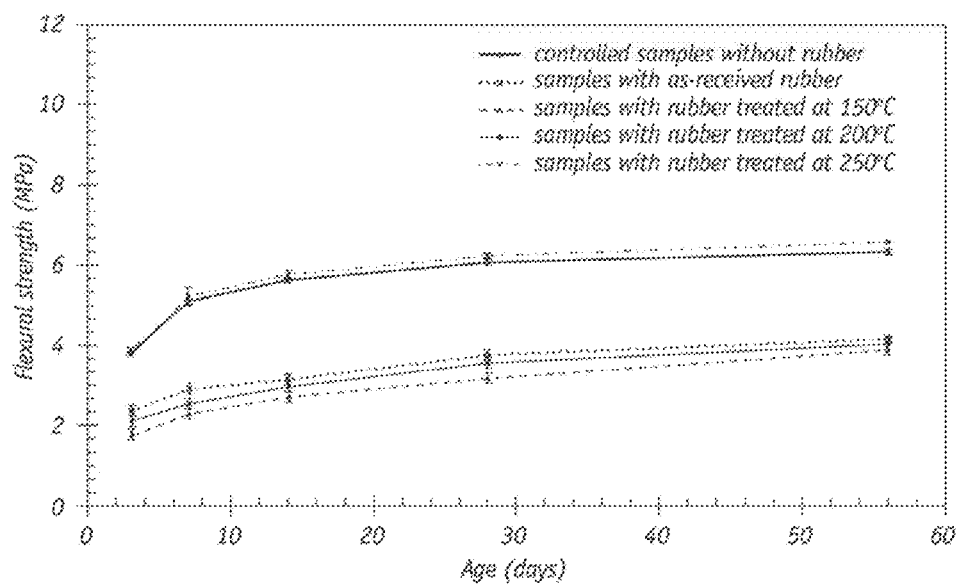
Figure 7:
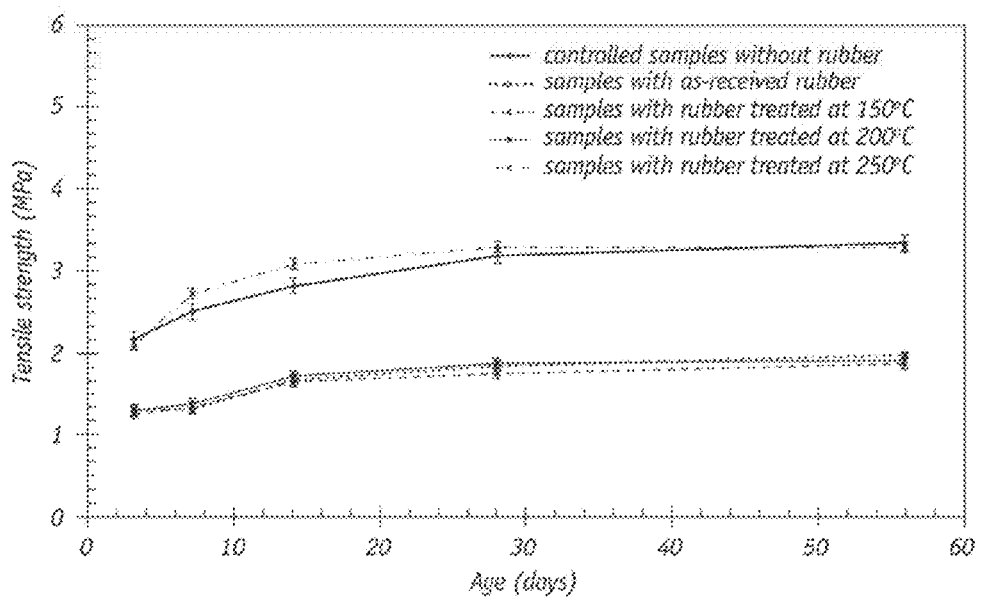

For statistical evaluation, nine mortar samples were prepared for each experiment. In particular, the crumb rubber was treated at 150° C., 200° C., and 250° C. respectively, and the oxygen/nitrogen ratio was kept at 0.04. Compressive, flexural, and tensile strengths are shown in FIGS. 5-7 respectively. Error bars are also depicted in these figures. For convenience of comparison, mechanical strengths of mortars with treated rubber (250° C.) at 28 days and 56 days are shown in Table 1, where "A" denotes the controlled specimen without rubber, "B" is the specimen with as-received rubber, and C represents the sample with rubber treated at 250° C.

TABLE 1

| | Mechanical strengths of specimens at 28 and 56 days | | | | | |
|---|---|---|---|---|---|---|
| Mechanical strength (MPa) | Compressive strength | | Flexural strength | | Tensile strength | |
| Age (days) | 28 | 56 | 28 | 56 | 28 | 56 |
| A | 34.8 | 39.2 | 6.1 | 6.2 | 3.2 | 3.3 |
| B | 16.3 | 19.4 | 3.8 | 4.2 | 1.8 | 1.9 |
| C | 41.2 | 42.1 | 6.2 | 6.6 | 3.3 | 3.3 |

In comparison with the controlled specimen, the addition of the as-received crumb rubber weakened the compressive. In particular, the data show that compressive strengths at 28 days decreased from 34.8 MPa to 16.3 MPa. In terms of percentage, the reduction was 53%. Flexural strengths decreased from 6.1 MPa to 1.8 MPa. The reduction was 37.7%. Tensile strengths decreased from 3.2 MPa to 1.8 MPa. It is a reduction of 43.7%. The reductions of compressive, flexural and tensile strengths at 56 days were 50.5%, 32%, and 42%, respectively. Based on these results, it is expected that concrete containing non-oxidized crumb rubber can replace the regular concrete only for applications in which strengths are not critical. In contrast, concrete with the partially oxidized rubber should exhibit better mechanical properties that of regular concrete.

Effect of Partial Oxidation on Mechanical Strength of Mortar Specimens

Waste rubber tires were partially oxidized at different temperatures and incorporated into mortar. As shown in FIGS. 5-7, mortar specimens with rubber treated at 250° C. had significantly better mechanical strengths as compared to those with the as-received crumb rubber. As shown Table 1, at 28 days the compressive strength was 41.2 MPa, which is greater than that of controlled specimens. At 56 days, the compressive strength of this specimen was 42.1 MPa, which is also greater than that of controlled specimens. Flexural and tensile strengths were 6.1 MPa and 3.3 MPa respectively at 28 days and 6.6 MPa and 3.3 MPa at 56 days. Both flexural and tensile strengths of these specimens were comparable to that of controlled specimens. However, the crumb rubber treated at 150° C. and 200° C. gave little improvement on mechanical strengths of mortars. Longer heating times at these lower temperatures should yield acceptable partially oxidized rubber particles.

Effect of Oxidation of Rubber on the Hydration of the Cement

Figure 8A:
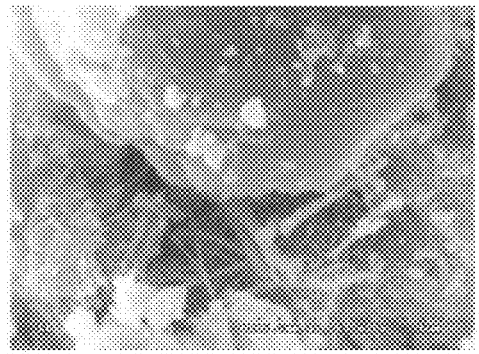
FIGS. 8A, 8B, 8C and 8D are scanning electron microscopy images of crumb rubber microstructures.
Figure 8B:
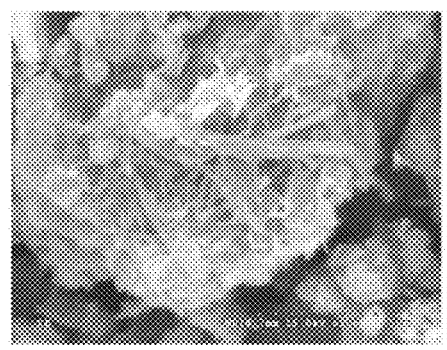
Figure 8C:
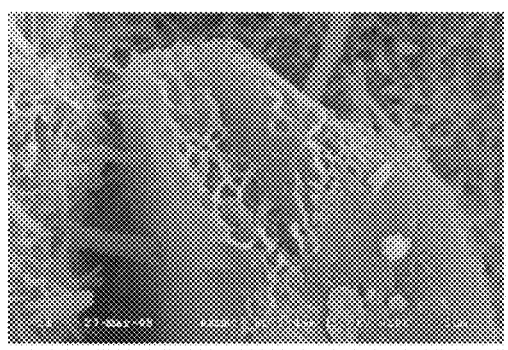
Figure 8D:
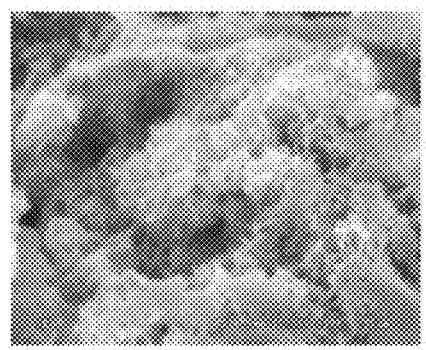

The SEM images of mortars with the crumb rubber were examined to determine the effects of partial oxidation on the hydration of the cement. The SEM images are shown in FIGS. 8A, 8B, 8C and 8D. FIG. 8A is the mortar containing the as-received crumb rubber. The images of specimens with the crumb rubber treated at 150° C., and 200° C. and 250° C. are given in FIGS. 8B, 8C, and 8D, respectively. These SEM images of mortars show that the crystals of hydrated products of mortars with treated rubber (250° C.) are much smaller. The morphology changed from long and thin (with the as-received crumb rubber) to short and compact needles (with the 250° C. crumb rubber) appears to be analogous to the changes in crystal morphology that occurs in the presence of superplasticizers, that are used in concrete compositions. The tensile and flexural strengths also increased significantly in comparison with that of mortars with the as-received rubber, in spite less than that of the compressive strength. However, the crumb rubber treated at 150° C., and 200° C. gave little effect on mechanical strengths of mortars. It is due to the formation of fewer hydrophilic function groups, $S=O$ and $S—O$, on the rubber surface.

Continuous Reactor for Partial Oxidation of Crumb Rubber

Figure 9:
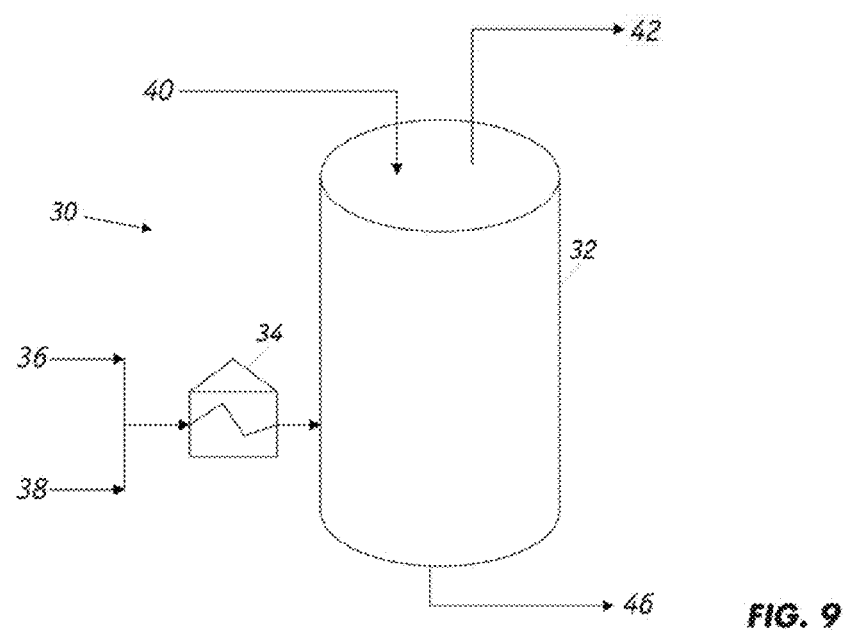
FIG. 9 is a schematic diagram of a continuous reactor.

Large scale partial oxidation of crumb rubber is preferably carried out in a continuous reactor system 30 as depicted in FIG. 9 where the operating parameters are carefully controlled. Air 36 and nitrogen gas 38 are mixed and heated in a pre-heater 34 to a predetermined temperature that is typical in the range from 100 to 500° C. and preferably from 150 to 350° C. and more preferably from 200 to 300° C. before the mixture enters the lower portion near the bottom of reactor 32. Prepared rubber particles 40 are continuously, fed through the upper portion near the top of reactor 32 at a controlled rate, so that the residence time of the rubber particles in the reaction zone is approximately from 30 minutes to 3 hours and preferably from 45 minutes to 2 hours. The rubber particles are agitated by the up-flow of air/nitrogen gas mixture as they descend and are withdrawn from the bottom of reactor 32 as treated crumb rubber 46 in a slow-moving bed fashion.

To control the reactor temperature and avoid over oxidation, the air-to-nitrogen volume ratio (A/N) is preferably maintained at a range of 5/1 to 1/7 and more preferably at a range of 1/2 to 1/5. If the A/N is too high with more than the desired oxygen level in the gas mixture, the reactor temperature will increase rapidly causing over oxidation and produce dry rubber particles. Conversely, if the A/N is too low, the functional groups (R—S—R) on the rubber surface remain unaffected even with good temperature control.

Formulation of Concrete Compositions

With the present invention, by incorporating partially oxidized rubber particles into cement mixes, rubberized concrete having improved compressive strength, flexural strength, and tensile strength can be produced. Conventional concrete is a hardenable mixture comprising cementitious materials (or cement mixes), a fine aggregate such as sand, a coarse aggregate, and water. Typically, the aqueous mixture includes 5 to 30% wt. Portland cement, 3 to 20% wt. water, and 10 to 85% wt. aggregate. The aggregate can be a mixture of fine and coarse aggregates where the fine aggregate preferably comprises sand that is present in the amount of 10 to 50% wt. The coarse aggregate when present typically comprises up to 50% wt. The partially oxidized rubber replaces some or all of the coarse aggregates. The relative proportions of the components in concrete compositions can vary depending on the desired properties of the cured product. See, for example, U.S. Pat. No. 5,624,491 to Liskowitiz et al. and U.S. Pat. No. 5,456,751 to Zandi et al, which are incorporated herein by reference.

The oxidized rubber particles will typically comprise 0.1 to 20 wt %, preferably 2 to 10 wt % and more preferably from 3.0 to 7.5 wt % of the concrete composition. By incorporating the oxidized rubber particles, proportionally less coarse aggregate material needs to be used. Concrete compositions made with the partially oxidized rubber particles will exhibit superior mechanical strengths. No superplasticizer is required to make the rubberized concrete of the present invention.

It is expected that inventive concrete compositions containing partially oxidized rubber will have a compressive strength of at least 35 MPa and preferably from 35 to 55 MPa after being cured for about 50 days or more, which is better than that of ordinary concrete. It is expected that inventive concrete compositions containing partially oxidized rubber will have a flexural strength of at least 4.5 MPa and preferably from 4.5 MPa to 5.7 MPa after being cured for about 50 days or more, which is comparable to that of ordinary concrete. It is expected that inventive concrete compositions containing partially oxidized rubber will have a tensile strength of at least 2.5 MPa and preferably from 2.5 MPa to 3.0 MPa after being cured for about 50 days or more, which is comparable to that of ordinary concrete.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of preparing a concrete composition that comprises the steps of:
    (a) producing partially oxidized rubber particles by heating rubber particles in the presence of oxygen to partially oxidize the rubber particles such that the surface of the particles form functional groups that are selected from the group consisting of the sulfoxides (R—SO—R), sulfones (R—$SO_2$—R), sulfur trioxides (R—$SO_3$) and mixtures thereof, wherein R represents hydrocarbons of the rubber particles; and
    (b) combining the partially oxidized rubber particles with cement, aggregates and water to form a concrete mixture.

2. The method of claim 1 wherein step (a) comprises heating the rubber particles in a mixture of oxygen and an inert gas to a temperature and for a sufficient length of time to partially oxidize the rubber particles.

3. The method of claim 1 wherein the rubber particles are recovered from waste tires, mechanically grounded and screened into irregular particles with desirable sizes in the range of 100 to 1,000 µm.

4. The method of claim 1 wherein the size of the rubber particles ranges from 300 to 600 µm.

5. The method of claim 2 comprising heating the rubber particles to a temperature in the ranges from 200 to 300° C.

6. The method of claim 5 wherein the temperature ranges from 200 to 250° C.

7. The method of claim 2 comprising heating the rubber particles for 30 minutes to 3 hours.

8. The method of claim 7 comprising heating the rubber particles for 45 minutes to 2 hours.

9. The method of claim 1 wherein the partially oxidized rubber particles comprises 0.1 to 20 wt % of the concrete mixture.

10. The method of claim 9 wherein the partially oxidized rubber particles comprises from 3 wt % to 7.5 wt % of the concrete mixture.

11. The method of claim 1 wherein the concrete mixture when cured has a compressive strength of at least 35 MPa.

12. The method of claim 1 wherein the concrete mixture when cured has a flexural strength of at least 4.5 MPa.

13. The method of claim 1 wherein the concrete mixture when cured has a tensile strength of at least 2.5 MPa.

14. The method of claim 2 wherein the rubber particles are recovered from waste tires, mechanically grounded and screened into irregular particles with desirable sizes in the range of 100 to 1,000 µm.

15. The method of claim 2 wherein the size of the rubber particles ranges from 300 to 600 µm.

16. The method of claim 14 comprising heating the rubber particles to a temperature in the ranges from 200 to 300° C.

17. The method of claim 16 comprising heating the rubber particles for 30 minutes to 3 hours.

18. The method of claim 2 wherein the partially oxidized rubber particles comprises 0.1 to 20 wt % of the concrete mixture.

19. The method of claim 2 wherein the concrete mixture when cured has a compressive strength of at least 35 MPa.

20. The method of claim 2 wherein the concrete mixture when cured has a flexural strength of at least 4.5 MPa.

21. The method of claim 2 wherein the concrete mixture when cured has a tensile strength of at least 2.5 MPa.

* * * * *